May 14, 1957  O. NYGAARD  2,791,977
REFRACTORY BURNER RINGS FOR FURNACE WALLS
Filed Aug. 3, 1950  2 Sheets-Sheet 1
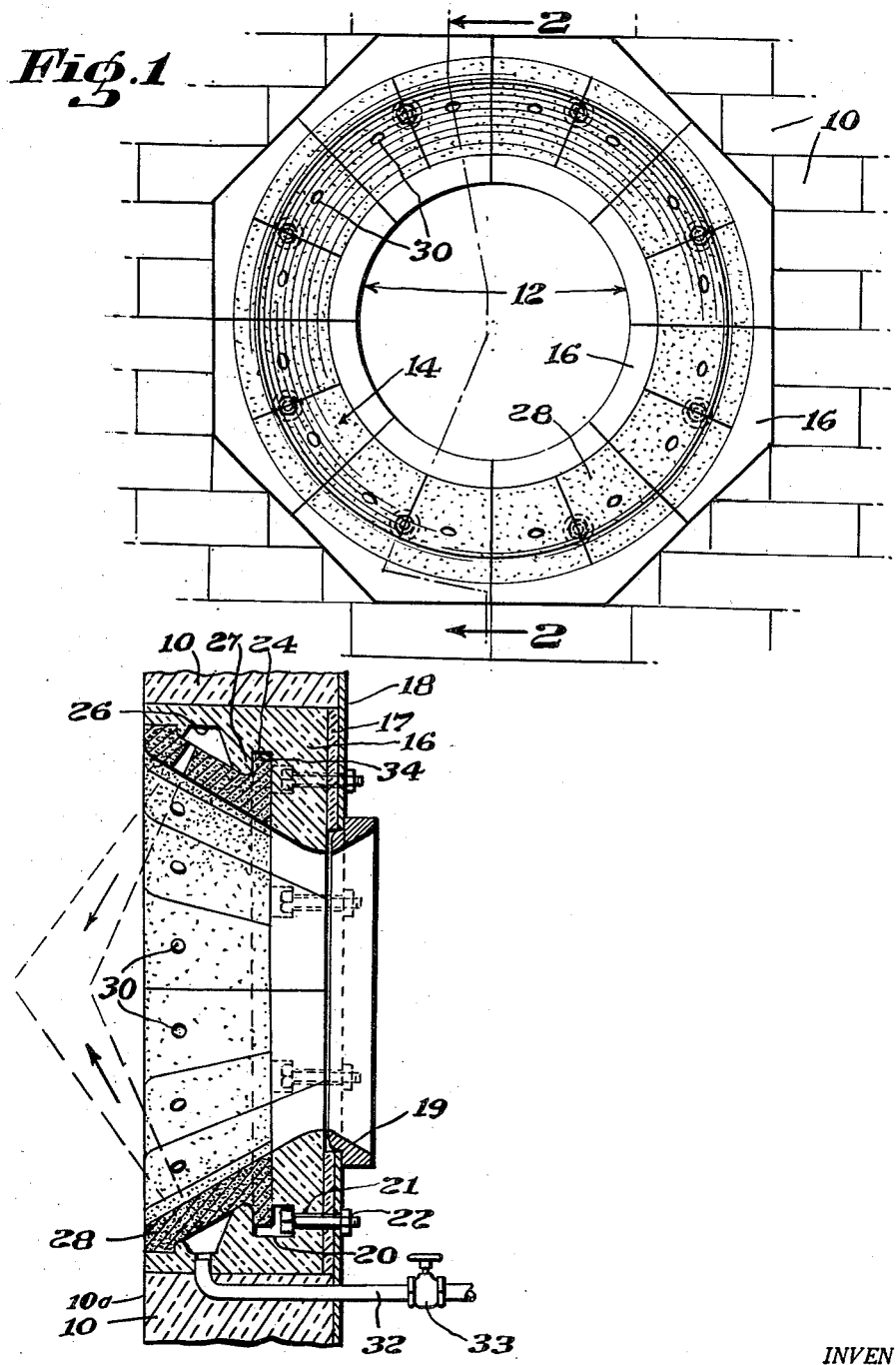
INVENTOR.
Oscar Nygaard
BY William R. Hulbert
ATTORNEY

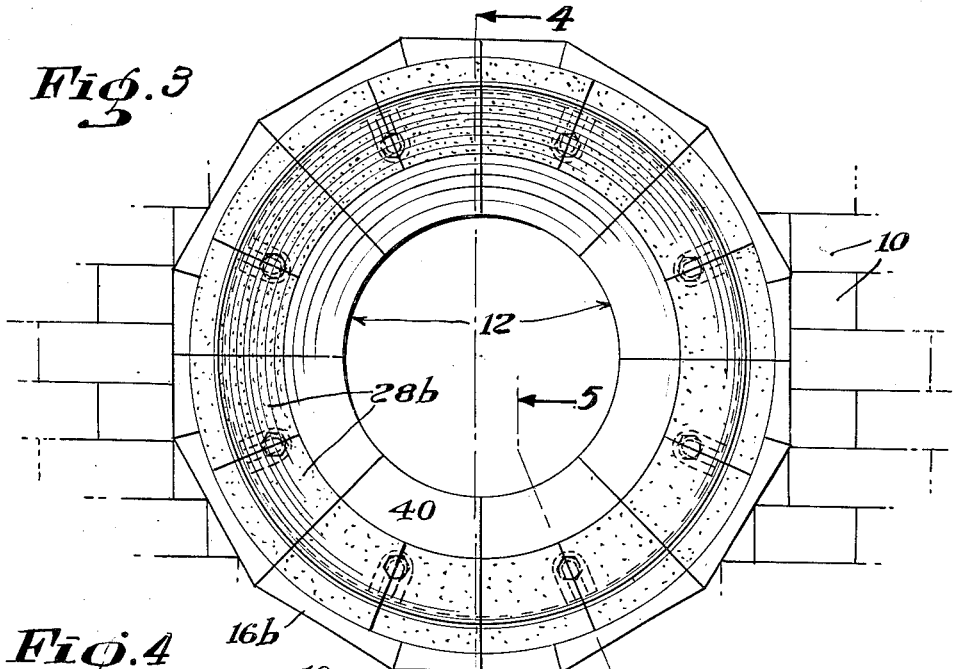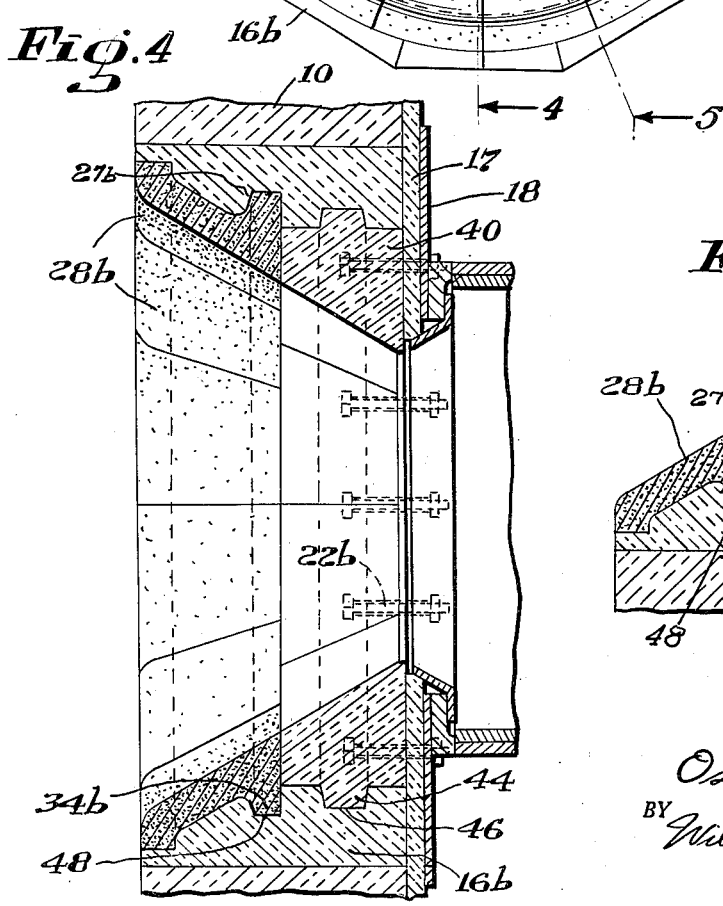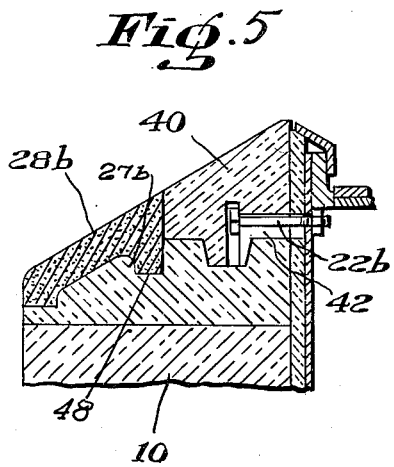

United States Patent Office 2,791,977
Patented May 14, 1957

2,791,977

REFRACTORY BURNER RINGS FOR FURNACE WALLS

Oscar Nygaard, Saugus, Mass., assignor to Bernitz Furnace Appliance Company, Boston, Mass., a corporation of Massachusetts Application August 3, 1950, Serial No. 177,473

4 Claims. (Cl. 110—1)

This invention relates to burner ring constructions for furnaces in which a finely divided fuel is burned, such as atomized oil, gas or powdered coal. More particularly it is concerned with a new and improved interlocking and self-supporting burner ring construction in which the components are anchored in place in a highly novel and simplified manner and producing important economies, both in initial cost and maintenance.

The construction commonly used for burner rings has been a combination of arched shapes especially designed to form, when assembled, the desired contour of the burner opening. Ordinary fire-clay brick material for such shapes has proved unsatisfactory when the furnace is operated at high capacity.

Higher heat resistant materials such as sillimanite, mullite and, to a lesser extent, silicon carbide have been used giving good results, but they are very expensive in the form employed in the past because of the large bulk of material required.

Of all the higher heat resistant materials which are commonly called "superrefractories" silicon carbide is now considered the most durable, thus making possible through its use operation of a power plant boiler unit over a much longer interval between very costly shut downs.

However, the exceedingly high initial cost of a burner ring using this refractory in the forms or shapes that make up the composite ring as employed in the past, has hitherto confined its use to a very few rather exceptional installations.

According to the prior art practice, the burner ring was constructed by bonding an annular series of silicon carbide members in the shape of arch brick to clay brick material, the bond being made by alternating long and short bricks and employing fire clay or high temperature cement for bonding material. In such a construction the bricks were set on edge side by side forming a relatively thick and costly silicon carbide ring, while the nature of the construction would necessitate longer shutdowns of the furnace to rebuild burned out rings. Furthermore the construction did not facilitate air cooling of the silicon carbide units to prolong their life.

It is a principal object of my invention to overcome these drawbacks of prior art burner ring constructions and provide an improved ring structure which will be both less expensive initially and will give longer service and facilitate replacement, requiring a minimum of expensive "super-refractory" materials.

Another object of the invention is to provide a structure of the type disclosed in which the more expensive super-refractory members, such as silicon carbide, when installed, will form a unitary interlocking mutually supporting ring which will be anchored to the supporting portions of the furnace wall without the necessity for any cement or clay bonding.

A further object of the invention is to provide a burner ring construction for use in furnaces burning finely divided fuels and having a very intense flame in which the expensive high refractory materials constituting the ring may be air-cooled to prolong their life and permitting the use of relatively thin components.

Yet another object of the invention is to provide a burner ring construction which will permit the injection into the furnace of converging jets of highly pre-heated air to improve the combustion therein.

These objects are accomplished by a construction wherein the outer main body of the burner ring is made up of radial block members of ordinary inexpensive fire-clay brick refractory, such blocks having pre-fixed anchoring means for mechanically or structurally interlocking with a series of high heat resistant refractory members which, when assembled, form a protective ring lining for the main body blocks of lesser heat resistant refractory over that portion of their surface subjected to the greatest heat and destruction.

By providing the composite members of the burner ring with positive structural interlocking features in the manner shown in the drawings, for rigid anchorage and support of the protective lining members, it is possible and practical to fabricate these in sections which are comparatively wide in a circumferential direction when installed and comparatively thin in the direction perpendicular to their greatest surface, i. e, in a direction toward the axis of the burner ring, whereby the number of pieces per ring and the amount of the expensive high heat resistant refractory material required is greatly reduced.

I have found that a thickness of as little as one and one-half inches of cross section in the thinnest dimension, as aforesaid, is ample for structural strength and to give adequate protection for some of the smaller size burner rings. With a refractory composed of silicon carbide such a thin structure is extremely important, not only from the standpoint of cost, but also because in the manufacture of brick shapes a maximum thickness of cross section not to exceed three inches must be maintained in order to obtain good quality in the finished product.

At no time will any thickness greater than that be necessary or even desirable in the type of burner ring shown and described herein and it is entirely due to the structural features disclosed that a comparatively thin protective lining is made possible.

In one form of the invention I provide an annular air conducting pasageway between the adjacent surfaces of the two series of anchoring and heat resistant members for air cooling the latter, the pasageway being formed by recessing the members of one series. The air cooling of the members permits the use of thinner components and prolongs their life.

Furthermore, optionally I may provide ports in the heat resistant members, which are also highly heat conductive, opening into the combustion chamber for directing jets of highly pre-heated air converging on the entering stream of fuel, the air being controlled as to quantity and pressure and heated in transit through the air cooling passageway formed between the heat resistant and anchoring members, and the air jets creating high turbulence in the stream of fuel for insuring complete combustion.

In one form of the invention each of the heat resistant members is anchored to a supporting member by means of a sharply angled overhanging projection on one of the members adapted to fit a corresponding recess in the other member.

In the case of relatively thin furnace walls, I have found that the anchoring members may be held directly by means of bolts to the front plate of the furnace. In the case of relatively thick walls, only the members abutting the face plate having an exposed surface in the throat of the burner ring are so anchored, the supporting tiles provided with the anchoring means for the heat resistant members being bonded by cement or otherwise to the outer layer of bricks and interlocked with the members which abut and are bolted to the face plate.

Other objects, advantages and features of the invention will become apparent from the following detailed description of a preferred embodiment thereof taken in connection with the accompanying drawings in which like numerals refer to like parts in the several views, and in which, Fig. 1 is an elevation of the interior wall of a furnace showing the throat of the burner opening embodying the novel burner ring construction of the invention;

Fig. 2 is a section on line 2—2 of Fig. 1;

Fig. 3 is an elevation similar to Fig. 1 of a modified form of the invention in which the burner ring construction is employed in a relatively thick furnace wall;

Fig. 4 is a section on line 4—4 of Fig. 4; and

Fig. 5 is a fragmentary detail showing the anchoring means for the heat resistant members taken on line 5—5 of Fig. 4.

The invention will first be explained with reference to the embodiment shown in Figs. 1 and 2 in which the numeral 10 denotes a furnace wall of standard fire brick having a burner opening 12 through which a fuel feeding mechanism (not shown) in registry therewith may feed finely divided fuel, such as gas, atomized oil or powdered coal, into the furnace combustion chamber. The burner ring portion 14 of the burner opening is enlarged inwardly of the furnace in more or less frusto-conical shape. Within the usual brick work 10 and lining the opening 12, there is built an annular structure of first quality clay anchor tiles 16 laid side by side in radial fashion and extending substantially from the front plate 18 of the furnace to the interior surface 10a of the furnace wall and providing a boundary for said opening. Between the plate 18 and the tiles 16 is interposed an asbestos layer 17. The burner throat ring 19 abuts the plate 18 around the opening 12.

The anchor tiles 16 are recessed at 20 and have openings 21 to receive anchor bolts 22 which securely anchor them to the front plate 18 of the furnace. The supporting members 16 are also provided with recesses 24 and 26 extending radially away from the opening 12, which join to form continuous annular recesses coaxial with the opening 12 when the tiles 16 are installed separated by radially inwardly extending projections 27.

Lining the hollowed out inner portions of the anchor members 16 is an annular series of high heat resistant and heat conductive ring tile members or nosepieces 28, preferably composed of super-refractory material such as silicon carbide, although such tiles may be composed of other commercially available materials such as sillimanite or mullite or any other quality high temperature resistant material found economical to use.

The nosepieces 28 are provided with generally conical ports 30 which flare inwardly of the furnace and which are directed into the combustion chamber of the furnace providing jets of air supplied under pressure to the passageway formed by the recesses 26 through a supply duct 32 and controlled by a valve 33, the air vented from the passageway entering the furnace in the form of high velocity jets converging, as shown by arrows in Fig. 2, and impinging inwardly of the burner ring upon and reacting with the entering stream of finely divided fuel to promote complete and rapid combustion.

By reason of the foregoing novel construction it is unnecessary to employ any bonding agent such as fire clay or high temperature cement to unite the super-refractory tiles of the burner ring with the anchor members 16. When the last tile 28 is installed, completing the burner ring, the resulting series of such members will be interlocking and mutually supporting in a radial direction. Furthermore, by reason of the aligned sharply angled projections 34, which form an annular rib extending radially outwardly from the outer end portions of the pieces 28 and engaging in the recesses 24 of the anchor tiles 16 and locked against the projections 27, the burner ring will be securely anchored against any movement inwardly of the furnace wall.

The flow of air supplied to the annular recess 26 serves to cool the relatively thin members 28 and thus prolong their service life. The novel construction has the further advantage of providing a means for introducing air, highly preheated during its passage through the recess 26, in converging jets which impinge upon the stream of entering fuel, thereby causing thorough commingling of air and fuel particles for producing more complete combustion in the furnace.

It will be noted, as shown in Fig. 1, that the members 28 and 16 have been so dimensioned that each member 16 will support two heat resistant tiles 28. It is evident that the invention is not confined to the dimensions herein disclosed and that members of other dimensions may be substituted therefor within the spirit and scope of the invention. However, I prefer to make the combined circumferential widths of the high heat resistant members 28 associated with each member 16 equal to the corresponding width of the latter, as shown in the drawing, so that after assembly an independent segment, or building unit, of the burner ring is formed and independently anchored, to expedite replacement in the ring when necessary without disturbing any adjacent segment unit.

Another form of the invention is disclosed in Figs. 3 to 5, showing the application of the novel burner ring construction of the invention to a relatively thick wall furnace. In this case it will be observed that the members 16b corresponding to the anchor members 16 of Figs. 1–2 are not directly bolted to the face of the furnace. Instead a series of intermediate members 40 of refractory material are installed to form a ring bordering the front plate of the furnace. The members 40 are anchored to the furnace front by bolts 22b, the members being recessed at 42 to accommodate such bolts.

Each of the members 40 has a projection 44 extending radially therefrom away from the burner opening for anchoring a corresponding member 16b. The supporting members 16b have recesses 46 to receive the projections 44 and also additional recesses 48 inwardly thereof to receive the corresponding projections 34b of the ring tiles 28b. The inner walls of the recesses 48 are formed by inwardly directed projections 27b, corresponding to the projections 27 and 27a in the other figures, and locking with the projections 34b of the members 28b.

In the case of Figs. 3–5, as in the other forms of the invention, relatively thin, easily replaceable, highly refractory nosepiece members form a burner ring lining overlying and protecting the less fractory and cheaper anchor members from the action of the intense burner flame.

Due to the novel construction providing anchoring facilities without depending on cement bonding to the main refractory body of the wall, I have been able to reduce the thickness of the silicon carbide lining to a minimum; thus reducing the cost to a point when it becomes very economical to use this construction which gives many times the length of service obtained with any other high grade refractory. With large boiler units in particular, it is very important to keep the boiler and furnace in operation over as long a period of time as possible. Some of the modern units cost, with auxiliaries, over $500,000 and if building room also is taken into account many of them will run close to a million dollars. Hence, boiler outage is very bad from that angle alone and usually it means crowding the other equipment to a point when efficiency is very much lowered.

The construction according to the invention permits the economical use of a very expensive material, making possible the sale and the resultant benefit to the user. There are other reasons also for the comparatively thin body of these tiles as shown in Figs. 1 and 2, such as rapid heat transfer to the cooling air, thus providing a higher preheat which is important in the promotion of good combustion. Also a lower fire face temperature of the ring surface by internal air cooling is made possible, thereby lengthening the service life of the installation.

While I have illustrated a preferred form of burner ring construction according to the invention, it will be understood that various modifications and changes in the same may occur to those skilled in the art, yet remaining within the spirit and scope of the appended claims.

I claim:

1. In a furnace wall having an outer face and an inner surface and an opening, a burner ring mounted in said opening to permit entry of fuel, said ring comprising an annular series of side-by-side supporting refractory members, anchors anchoring each of said supporting members to said wall face, each of said supporting members having a dimension in a direction parallel to the axis of said opening substantially equal to the thickness of said wall and having portions of its surface facing the axis of said opening cut away to form a hollow, said supporting members further having projections extending radially toward said axis within said hollows, which projections when said supporting members are in place are aligned to form an annular rib, said supporting members having recesses positioned adjacent said projections located at the portion thereof nearest said outer face, said recesses when said supporting members are in place being aligned to form a continuous annular recess, said rib and annular recess facing the axis of said opening, an annular series of side-by-side heat resistant refractory members fitting said hollows and having radially outwardly projecting ridges aligned with each other and being received in said recesses, said heat resistant members being locked against movement in a direction inwardly of the furnace in a direction parallel to the axis of said opening by the coaction of the mutually engaging surfaces of said ridges and recesses, said supporting members being substantially thicker than said heat resistant members in a direction radial of said axis and containing the bulk of the material of said ring, said heat resistant members being substantially thinner than said supporting members in a direction radial of the axis of said opening and covering at least the major portion of the radially inwardly facing surfaces of the latter to shield the same from the heat of the furnace.

2. The combination as claimed in claim 1 in which the members of at least one of said series are recessed on the side thereof adjacent the members of the other series to form an annular passageway therebetween for the circulation of air.

3. The combination as claimed in claim 2 in which at least some of said heat resistant members are provided with ports therethrough into said annular passageway for venting the same, said ports being constructed and arranged so as to direct jets of preheated air in a converging manner upon the axis of said burner opening inwardly of said furnace wall.

4. The combination as claimed in claim 1 wherein each of said supporting members is composed of two interlocked sections, one of said sections being located radially inwardly of the other and adjacent said wall face, each of said anchors forming a direct connection between one radial inwardly located section and said face.

References Cited in the file of this patent

UNITED STATES PATENTS

| | | |
|---|---|---|
| 1,133,200 | Tipple | Mar. 23, 1895 |
| 1,393,647 | Spillane | Oct. 11, 1921 |
| 1,410,729 | Balz | Mar. 28, 1922 |
| 1,698,555 | Molz | Jan. 8, 1929 |
| 1,812,315 | Baumgartner | June 30, 1931 |
| 1,828,839 | Hawke | Oct. 27, 1931 |
| 1,861,759 | Soper | June 7, 1932 |
| 1,957,098 | Denny | May 1, 1934 |
| 1,992,620 | Johnson | Feb. 26, 1935 |
| 2,126,417 | Sharp | Aug. 9, 1938 |
| 2,192,682 | Anderson | Mar. 5, 1940 |
| 2,242,797 | Lucke | May 20, 1941 |
| 2,427,545 | Berger | Sept. 16, 1947 |
| 2,430,396 | Gollin | Nov. 4, 1947 |